Oct. 19 1948.  A. E. B. PERRIGO  2,451,633
SLOT CLOSER FOR DYNAMOELECTRIC MACHINES
Filed Nov. 15, 1947

Inventor
ALBERT EDWARD BELL PERRIGO
by
Richards & Geier
Attorneys

UNITED STATES PATENT OFFICE 2,451,633

SLOT CLOSER FOR DYNAMOELECTRIC MACHINES

Albert Edward Bell Perrigo, Walsall, England, assignor to H. Frost and Company Limited, Walsall, England, a company of Great Britain Application November 15, 1947, Serial No. 786,180
In Great Britain May 31, 1947

9 Claims. (Cl. 171—252)

This invention relates to dynamo-electric machines, such as induction motors, having stators or rotors provided with initially-open winding-receiving slots separated by pole teeth and which are closed, after the windings have been introduced, by means of closure strips or bars.

Whilst fully-open slots between the teeth or poles of the stator or rotor enable the windings to be readily inserted, as, for example, when former-wound coils are used, the flux distribution in the air gaps between the teeth is not so efficiently distributed as with partially-closed slots when closure members composed entirely of non-magnetic material are used.

The object of the present invention is to enable the reluctance of the flux leakage path across adjacent teeth to be controlled to a value which will give the most efficient flux distribution in the air gaps, so that a machine with open slots can be made to give a performance substantially equal to that given by a corresponding machine having partially-closed slots.

According to the invention, in a dynamo-electric machine having coils in open slots, the slots are closed by strips or bars of composite unitary construction comprising separate longitudinal side members made of magnetic material in direct contact with the pole teeth and an intermediate longitudinal portion of non-magnetic material which connects together and spaces apart the side members so as to form therewith a self-contained unit.

Figure 1 of the accompanying drawings is a fragmentary elevation of the inside face of a portion of the stator of an induction motor having slot-closing means in accordance with the present invention.

Figure 1:
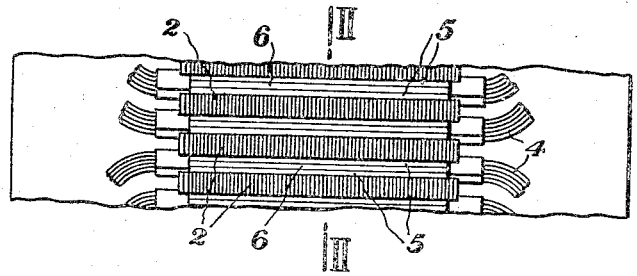
Figure 2:
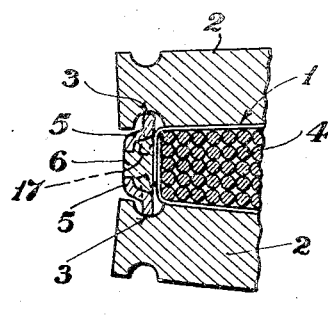
Figure 2 is a cross-section through two of the teeth and the closure strip between them, on a larger scale, the section being taken on a plane corresponding to line II—II, Figure 1.

Referring to Figures 1 and 2 of the drawings, which illustrate one form of the invention in connection with the stator of an induction motor, the said stator has initially-open coil-receiving slots 1 formed between the side walls of parallel-sided pole teeth 2 by the axial alignment of corresponding slots formed in the laminations of which the stator is formed. In the opposite side walls of these coil slots, at a short distance inwards of the open ends, longitudinal grooves 3 are provided, and after former-wound coils 4 of round wire, or other windings, have been introduced into the open slots, the latter are closed by means of closure strips or bars which are slid endwise into the grooves in the side walls of the slots. Each of these strips or bars consists of two separate longitudinal side members 5, 5, made of magnetic material connected together and spaced apart, to form a self-contained unit strip, by a longitudinal intermediate rigid portion 6 of non-magnetic material.

The side members 5 are in the form of sheet-metal strips or pressings. They are of a double-angle or cranked section, with outwardly presented set-back longitudinal flanges, and inwardly-presented flanges at the front. The two strips 5, 5, are spaced apart, with their front flanges in alignment but spaced apart, and they are joined together by the intermediate non-magnetic material 6. This material may be a suitable plastic which is moulded upon and bonded to the side members 5 so as to fill up the hollow space between the two members flush with the set-back outwardly-presented flanges, and also so as to fill up the air gap or space between the opposed edges of the front flanges, flush therewith. The plastic material may be held and bonded to the metallic side members by providing the latter with struck-up keying lugs 7 which are embedded in the plastic material. A self-contained closure strip or bar of unit construction is thus provided, and it can be slid endwise into the grooves 3 of the teeth by means of its outwardly-presented flanges, which are in direct contact with the teeth 2. When in position the strips interlock with the teeth and the front flanges of the side members are substantially flush with the outer faces of the teeth.

Figure 3:
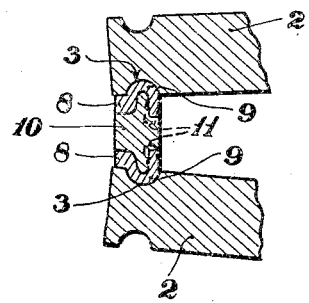
Figure 3 is a similar sectional view of a modification.

According to a modification shown in Figure 3, each closure strip unit comprises two laterally-spaced metallic side members 8, 8, of magnetic material, each of hook-like section comprising a short front straight portion and an integral outwardly-bent part 9 of U-section forming an outwardly-presented flange and an inwardly-presented groove. The two members are located in opposed relation and spaced apart, with the groove of one opposed to the groove of the other; and they are connected together by pastic material 10 moulded into the space between them so as to fill up said space, including the grooves and the spacing gap at the front, said material being then flush with the front and rear surfaces of the metal members. A strip of unit construction is thus formed, which can be engaged between adjacent teeth 2 by sliding the outwardly-presented flanges into the grooves 3 of the teeth, the outer face of the strip being then substantially flush with the end faces of the teeth. Struck-up keying lugs 11 may be provided on the side members for embedding in the plastic material.

Figure 4:
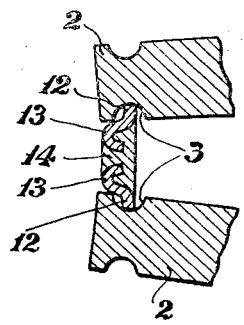
Figure 4 is a section showing another modification.

In another modification, shown in Figure 4, two metal side members 12 of magnetic material are of similar hook section to those last described, but they are positioned and laterally spaced with the bends of the U-shaped portions 13 presented forwardly, the straight portions projecting laterally to form outwardly-presented flanges. They are connected together, to form a unit strip, by plastic material 14 moulded into the space between them and into the hollows of the U-portions, flush with the front and rear surfaces. The outwardly-presented flanges are inserted into the grooves 3 of the teeth 2 so that the front faces of the strips are flush with the end faces of the teeth.

Figure 5:
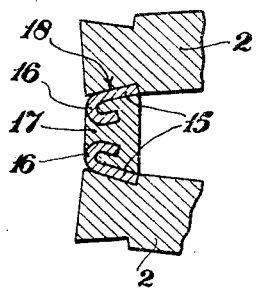
Figure 5 is a section showing a further modification.

Again, in a further modification, represented in Figure 5, the composite closure strips may comprise two laterally-spaced metal side members 15 of magnetic material each of J-section, but mutually reversed, the hook portions 16 being at the front and being opposed laterally. These members are inclined outwards towards their rear ends, and the space between them is filled with plastic material 17 flush with the front and rear ends, the said material filling the hook portions and also the air gap between the hook portions, being bonded to the side members to form a self-contained unit of dovetail or wedge section. This unit is adapted to be slid endwise into interlocking engagement with dovetail recesses 18 formed in opposite faces of adjacent teeth 2, so that the front of the strip is flush with the end faces of the teeth.

In all cases, the spacing of the magnetic side members and the material of which they are formed is so chosen that the reluctance of the magnetic leakage path between adjacent stator teeth is controlled to give the most efficient flux distribution.

I claim:

1. A dynamo-electric machine having open coil-receiving slots between adjacent pole teeth, in combination with coils in the slots and composite slot-closing strips of unit construction comprising separate longitudinal side members of magnetic material in direct contact with the pole teeth and an intermediate longitudinal portion of non-magnetic material which connects and spaces the side members to form therewith a self-contained unit.

2. A dynamo-electric machine having open coil receiving slots between adjacent pole teeth, in combination with coils in the slots and composite slot closing strips of unit construction comprising separate longitudinal side members of magnetic material and an intermediate longitudinal portion of non-magnetic material which connects and spaces the side members to form a self-contained unit, the rear portions of the side members extending laterally beyond the front portions and interlocking with adjacent pole teeth so that the front faces of the strips are substantially flush with the end faces of the teeth.

3. A dynamo-electric machine having open coil-receiving slots between adjacent pole teeth, in combination with coils in the slots and composite slot-closing strips of unit construction comprising separate longitudinal side members of magnetic material and an intermediate portion of non-magnetic material which connects and spaces the side members, said side members having set-back outwardly-extending flanges engaging grooves in the side portions of the teeth so that the front faces of the strips are substantially flush with the end faces of the teeth.

4. A dynamo-electric machine having open coil-receiving slots between adjacent pole teeth, in combination with coils in the slots and composite slot-closing strips of unit construction comprising two separate longitudinal side members of magnetic material pressed to a section having set-back outwardly-presented flanges engaged with the teeth, said side members being connected by and bonded to an intermediate filling of non-magnetic material moulded within the space between said side members.

5. A dynamo-electric machine having open coil-receiving slots between adjacent pole teeth, in combination with coils in the slots and composite slot-closing strips comprising side members of magnetic material having a cranked section forming set-back outwardly-extending flanges engaging grooves in the teeth, said members being connected by an intermediate portion of non-magnetic material which holds the said members in spaced relation and forms a closure strip of unit construction.

6. A dynamo-electric machine having open coil-receiving slots between pole teeth, in combination with coils in the slots and composite slot-closing strips comprising separate longitudinal side members of magnetic material and of a bent hook section with outwardly-presented set-back flanges, said side members being connected by and bonded to an intermediate member of non-magnetic material moulded in the space between the side members so as to hold the latter together in spaced relation and form a self-contained unit.

7. A dynamo-electric machine having open coil-receiving slots between adjacent pole teeth, in combination with coils in the slots and composite slot-closing strips comprising separate longitudinal side members of J-section disposed in reversed relation and spaced apart, and an intermediate filling of non-magnetic material moulded between the side members so as to connect and space the same and form a unit closure strip of dovetail section.

8. A composite strip for closing a coil-receiving slot of a dynamo-electric machine comprising separate longitudinal side members made of magnetic material and an intermediate longitudinal portion of non-magnetic material which connects and spaces the side members to form a self-contained unit, the said side members having outwardly-extending flange parts set back from one face of the strip.

9. A composite strip for closing a coil-receiving slot of a dynamo-electric machine comprising separate longitudinal side members made of magnetic sheet material fashioned to a section which provides outwardly-extending flanges set back from one face of the strip, in combination with an intermediate filling of non-magnetic material moulded within the space between the side members and serving to connect and space said members to produce a self-contained unit strip.

ALBERT EDWARD BELL PERRIGO.

No references cited.